United States Patent
Oran

(10) Patent No.: US 7,502,320 B2
(45) Date of Patent: Mar. 10, 2009

(54) METHOD AND APPARATUS FOR NETWORK-BASED ADMISSION CONTROL USING PATH-COUPLED QUALITY OF SERVICE SIGNALING

(75) Inventor: David R. Oran, Acton, MA (US)

(73) Assignee: Cisco Technology, Inc., San Jose, CA (US)

( * ) Notice: Subject to any disclaimer, the term of this patent is extended or adjusted under 35 U.S.C. 154(b) by 533 days.

(21) Appl. No.: 11/176,785

(22) Filed: Jul. 6, 2005

(65) Prior Publication Data

US 2007/0008882 A1 Jan. 11, 2007

(51) Int. Cl.
*H04L 12/24* (2006.01)
(52) U.S. Cl. ....................................... 370/231
(58) Field of Classification Search ................... 370/231
See application file for complete search history.

(56) References Cited

U.S. PATENT DOCUMENTS

| | | | |
|---|---|---|---|
| 6,721,272 B1 | 4/2004 | Parnafes et al. | |
| 2001/0026554 A1* | 10/2001 | Holler et al. | 370/401 |
| 2002/0112073 A1 | 8/2002 | MeLampy et al. | |
| 2002/0114282 A1 | 8/2002 | MeLampy et al. | |
| 2002/0133600 A1* | 9/2002 | Williams et al. | 709/228 |
| 2002/0145975 A1 | 10/2002 | MeLampy et al. | |
| 2002/0169887 A1 | 11/2002 | MeLampy et al. | |
| 2003/0035401 A1* | 2/2003 | Shaheen et al. | 370/341 |
| 2003/0091026 A1 | 5/2003 | Penfield et al. | |
| 2003/0145077 A1 | 7/2003 | Khan et al. | |
| 2003/0161310 A1 | 8/2003 | Dobbins et al. | |
| 2003/0179761 A1 | 9/2003 | Dobbins et al. | |
| 2004/0013119 A1 | 1/2004 | MeLampy et al. | |
| 2005/0066053 A1* | 3/2005 | McDysan | 709/243 |
| 2005/0232238 A1 | 10/2005 | Oran | |
| 2006/0028981 A1* | 2/2006 | Wright | 370/229 |

OTHER PUBLICATIONS

U.S. Appl. No. 10/828,370, filed Apr. 19, 2004, Oran.
Handley, M., et al., "SIP: Session Initiation Protocol", RFC 2543, Mar. 1999.
Yavatkar, R., et al., "A Framework for Policy-based Admission Control", RFC 2753, Jan. 2000.
Rosenberg, J., et al., "SIP: Session Initiation Protocol", RFC 3261, Jun. 2002.
PacketCable™ Multimedia Specification, PKT-SP-MM-I02-040930, Cable Television Laboratories, Inc., copyright 2003-2004.

* cited by examiner

*Primary Examiner*—Melvin Marcelo
(74) *Attorney, Agent, or Firm*—Stolowitz Ford Cowger LLP

(57) ABSTRACT

A Resource ReSerVation Protocol (RSVP) proxy is used in combination with a signaling proxy to provide improved admission control, Quality of Service (QoS) reservation, and media path routing. This avoids entangling call signaling with media plane functions as required with Session Border Controllers (SBCs). A QoS network control scheme, such as Packet Cable Multi-Media (PCMM) and/or Dynamic Quality of Service (DQoS), is conventionally used to set up QoS and other flow states on an access network. However, the gate parameters established during this access operation are also provided to an RSVP proxy in an edge router. The gate parameters trigger the RSVP proxy to attempt to establish a QoS reservation over the packet network toward a media flow destination. If admission control for the QoS reservation is successful, the edge router permits the signaling proxy to complete the media call.

22 Claims, 6 Drawing Sheets

METHOD AND APPARATUS FOR NETWORK-BASED ADMISSION CONTROL USING PATH-COUPLED QUALITY OF SERVICE SIGNALING

BACKGROUND

Internet Service Provider (ISP) networks contain routing and switching equipment that connect users to other endpoints in the same ISP network or to endpoints in other ISP networks. Internet Service Providers generally do not like users forming end-to-end connections through their networks that cannot be monitored. For example, the ISP network may include firewalls, that need to monitor all incoming connections in order to prevent unauthorized network access. Other equipment, such as Network Address Translators (NATs), may also need to monitor user connections in order to convert between public and private Internet Protocol (IP) addresses.

Network connections may also need to be continuously monitored in order to diagnose network problems. For example, when two endpoints establish an end-to-end session, the ISP has limited visibility to the communications transferred between the two users. This may prevent the ISP from debugging subsequent network failures.

End-to-end user connections arguably make it more difficult for the ISP to manage Quality of Service (QoS) for different types of data or for different users. With end-to-end connections, the user machines generally have the responsibility for requesting and monitoring QoS. Without ISP system level QoS management, a user may request higher QoS than is necessary for certain types of media communications. This may disrupt other media communications that do require high QoS, such as a real-time VoIP phone calls.

The Resource ReSerVation Protocol (RSVP) is a path coupled signaling protocol that goes from one endpoint to an opposite endpoint and through every router between the two endpoints. The routers install states associated with the type of service requested by the users. When all the routers along the media path indicate a level of requested service can be provided, the endpoints are notified that admission control has succeeded and the reserved media path is then used for transporting media.

RSVP is not preferred by many ISPs partly because it typically is initiated by the users. As mentioned above, it is perceived by the ISP as a loss of control over QoS management. Further, many user host devices, such as personal computers, may not implement RSVP, which would then prevent any admission control of QoS service for the media call.

Session Border Controllers (SBCs) are currently being used to manage signaling and media at the edges of ISP networks. The SBC may conduct signaling sanitization that removes certain information from the call signaling, such as public IP addresses, caller ID information, etc. The SBC may also modify information, such as converting private IP addresses to a public NAT addresses. The SBC may also modify QoS service bits for media packets.

If ISPs adopted end-to-end path-coupled admission control signaling, there would be little need for SBC media plane functions. However, as described above, Multiple System Operators (MSOs) require and have adopted additional QoS control such as provided by Dynamic Quality of Service (DQoS) and Packet Cable Multi-Media (PCMM). This QoS control utilizes an SBC to provide admission control at multiple points along the media path.

In order to do so, the SBC must have topological knowledge of the media paths. This is inconvenient, can be a performance bottle-neck and usually results in poor responsiveness to routing changes or outages.

Thus, the SBC is required to sit in both the control path and data path for each network flow that requires ISP management. The SBC intercepts all application signaling and inserts itself in both the signaling and the media path established by the associated application. This requires the applications used for establishing media connections to communicate directly with the SBCs. For example, a Session Initiation Protocol (SIP) or H.323 signaling session is required to conduct signaling for every VoIP call through the SBC. In addition to the signaling, the audio data for the VoIP call must also be routed through the same SBC.

This management architecture causes several problems. For example, when the SBC fails, all the media sessions managed by the SBC are terminated. This compromises reliability for the overall ISP network. End-to-end media security is also broken, since the SBC requires access to the session encryption keys in order to manage the data in the media session.

When centralized in the ISP network, the SBC becomes a hotspot, since all communications needs to be routed through the same node. Inefficient routing problems remain even when SBCs are distributed out toward the user access locations. For example, routing algorithms have to be reconfigured to route all communications through the remote SBCs. This causes media to be routed along suboptimal network paths. For instance, instead of using optimized routing algorithms that may establish a relatively direct Internet connection between two closely located endpoints, the IP connection may have to be routed through two SBCs that are located in geographic locations remote from both endpoints. This is not only inefficient, but may also introduce significant extra delay, which is highly disadvantageous for delay-sensitive applications such as VoIP.

The present invention addresses this and other problems associated with the prior art.

SUMMARY OF THE INVENTION

A Resource ReSerVation Protocol (RSVP) proxy is used in combination with a signaling proxy to provide improved admission control, Quality of Service (QoS) reservation, and media path routing. This avoids entangling call signaling with media plane functions as required with Session Border Controllers (SBCs). A QoS access network control scheme, such as Packet Cable Multi-Media (PCMM) and/or Dynamic Quality of Service (DQoS), is conventionally used to set up QoS and other flow states on an access network. However, the gate parameters established during this access operation are also provided to an RSVP proxy in an edge router. The gate parameters trigger the RSVP proxy to attempt to establish a QoS reservation over the packet network toward a media flow destination. If admission control for the QoS reservation is successful, the edge router permits the signaling proxy to complete the media call.

The foregoing and other objects, features and advantages of the invention will become more readily apparent from the following detailed description of a preferred embodiment of the invention which proceeds with reference to the accompanying drawings.

DETAILED DESCRIPTION

Figure 1:
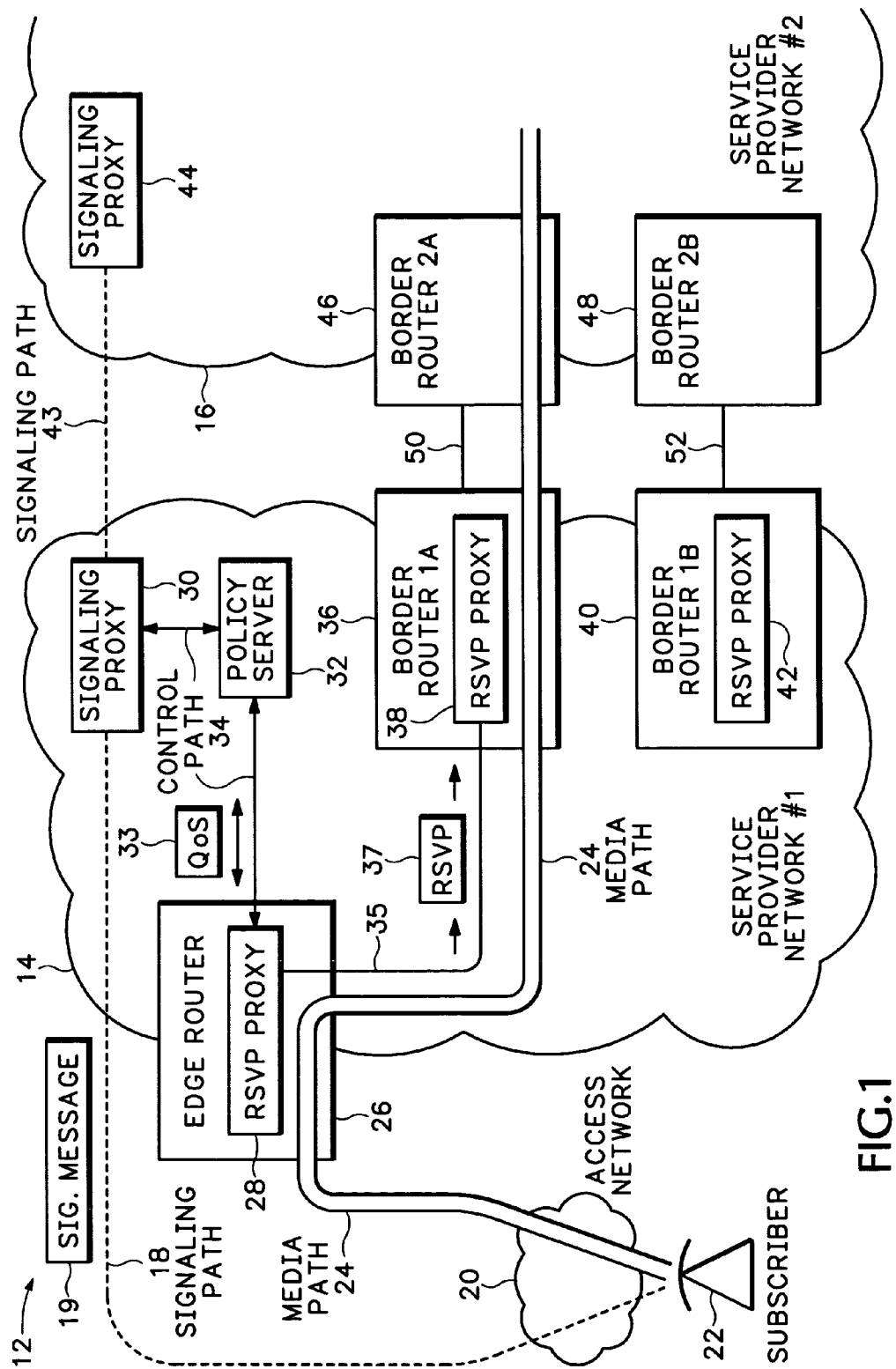
FIG. 1 is a diagram of a service provider network that provides improved media call management.

Referring to FIG. 1, a first service provider network 14 includes an edge router 26 that connects to a subscriber 22 through an access network 20. The access network 20, in one example, may be a DOCSIS-based Hybrid Fiber-coax (HFC) network providing high-speed broadband service to consumers and businesses. The subscriber 22 can be any device that needs to establish a media connection with another endpoint. For example, the subscriber 22 may be a Personal Computer (PC), Voice Over Internet Protocol (VoIP) phone, Analog Terminal Adapter (ATA) device, or any other type of server or processing device that transmits and/or receives media over an IP network.

The first service provider network 14 includes a border router 36 that communicates over a link 50 with a second service provider network 16. Additional border routers 40 in the first service provider network 14 communicate though separate links 52 to the second service provider network 16, or to other service provider networks that are not shown in FIG. 1.

The service provider networks 14 and 16 can be any Internet Protocol (IP) packet switched network that includes multiple routers, switches, or other network processing devices that form a portion of the Internet, Wide Area Network (WAN), Metropolitan Area Network (MAN), etc. In one example, the individual service provider network 14 is operated by a common business entity, such as an Internet Service Provider (ISP), Multiple System Operator (MSO) or other business enterprise. It is generally the case that the second service provider network 16 is operated by a different business entity. However, the service provider networks 14 and 16 are not required to be operated by any particular organization or entity.

Application intermediaries are used in the service provider network 14 for voice and video applications. These intermediaries are generally referred to as "signaling proxies" when employed for real-time applications such as VoIP or video conferencing. They manage the signaling for setting up media sessions among subscribers. A quality of service manager integral to the signaling proxy is then used for requesting QoS treatment for particular service flows.

For example, a signaling proxy 30 in network 14 manages call signaling when the subscriber 22 initiates or receives a media call. The media call can contain any type of media that needs to be transferred between two endpoints, such as, a Voice Over Internet Protocol (VoIP) audio call, or any other type of streaming video and/or audio, or other real-time data transmission. Examples of signaling proxies 30 include Session Initiation Protocol (SIP) proxies and H.323 proxies/gatekeepers. The SIP proxy and H.323 gatekeeper are described in several Request For Comments (RFC) including RFC 2543 and 3261 which are herein incorporated by reference.

The signaling proxy 30 receives signaling messages 19 from the subscriber 22 over a signaling path 18. The signaling proxy 30 interprets and then forwards the signaling messages 19 toward a destination endpoint. The signaling messages 19 may traverse several signaling proxies on the way to the destination endpoint. For example, the signaling proxy 30 may forward some signaling messages 19 to another signaling proxy 44 in service provider network 16. Each signaling proxy 30 and 44 may make routing decisions and modify the signaling messages 19 before forwarding the call request to a next network processing element.

In one embodiment, the signaling proxy 30 uses the PacketCable Multimedia (PCMM) protocol over a control path 34 for setting up a QoS state in the edge router 26. The PCMM protocol is described in Cable Television Laboratories, Inc. (CableLabs®) PacketCable™ Multimedia Specification PKT-SP-MM-I02-040930 and RFC 2753 which are both herein incorporated by reference.

A policy server 32 functions as an intermediary between the signaling proxy 30 and the edge router 26 and applies a set of policy rules that have been pre-provisioned by the operator of service provider network 14. The signaling proxy 30 uses control path 34 through the policy server 32 to setup media path states in the edge router 26 associated with the signaling messages 19. The signaling proxy 30 and policy server 32 can operate in the same device or can be separate devices.

In conventional service provider QoS management systems, such as PCMM, QoS state information is pushed from the signaling proxy 30, through the policy server 32, to the edge router 26. The edge router 26 then uses this QoS information to provide QoS over the access network 20 between the subscriber 22 and the service provider network 14. However, these conventional QoS management systems for access networks do not provide admission control, QoS control, or identify paths for the media within the service provider network 14 or for connection between service provider networks 14 and 16. To resolve these limitations, access network QoS control is used in conjunction with RSVP proxies.

Extending QoS Over and Between Service Provider Networks

An RSVP proxy 28 is operated in the edge router 26 and RSVP proxies 38 and 42 are operated by the border routers 36 and 40, respectively. The operation of RSVP proxies 28, 38 and 42 are described in detail in U.S. Pat. No. 6,721,272, issued Apr. 13, 2004, entitled: METHOD AND APPARATUS FOR GENERATING AN RSVP MESSAGE FOR A NON-RSVP-ENABLED NETWORK DEVICE; and in U.S. patent application Ser. No. 10/828,370, filed Apr. 19, 2004, entitled: METHOD AND APPARATUS FOR DYNAMICALLY DETERMINING WHEN TO USE QUALITY OF SERVICE RESERVATION IN INTERNET MEDIA APPLICATIONS which are both herein incorporated by reference.

RSVP proxies 28, 38 and 42 allow the edge router 26 to initiate RSVP on behalf of subscriber 22 in accordance with QoS control messages provided by signaling proxy 30. The RSVP proxy 28 determines when a subscriber data flow requires QoS, and on behalf of the subscriber, initiates an RSVP Reservation Session that secures a QoS provisioned path 35 through the service provider network 14. The RSVP proxies also provide admission control both at edge router 26 and at border router 36.

This enhanced access control scheme combines the QoS protocol used for the access network 20 (e.g., PCMM/DQoS) with an internal media path QoS protocol (e.g., RSVP) to provide more effective QoS and admission control in ISP networks. This provides substantial improvements over existing session border controller architectures since signaling and media paths can now be processed in separate conventional preexisting network processing elements while also allowing the service provider to manage media calls. Calls also do not have to be rerouted through SBCs that reside outside the conventional media routing path 24. Subscriber endpoints do not have to originate and terminate RSVP signaling, alleviating the ISP concerns over maintaining control and visibility of media flows. Other advantages of the enhanced access control scheme are described in more detail below.

Figure 2:
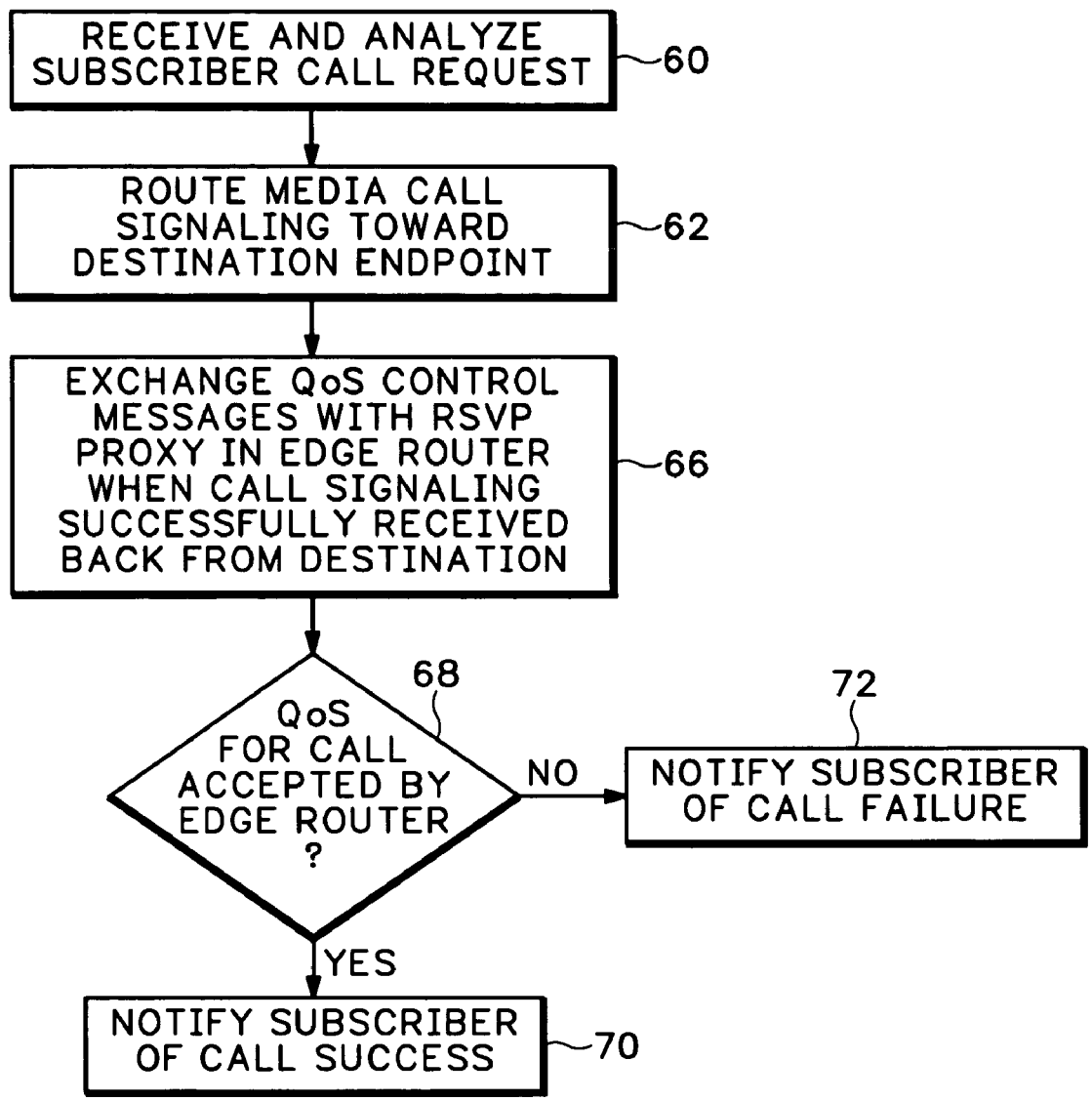
FIG. 2 is a flow diagram showing how a signaling proxy operates in the service provider network in FIG. 1.

Referring to FIGS. 1 and 2, in operation 60, the signaling proxy 30 receives and analyzes a media call request from the subscriber 22 via signaling messages 19. In one example, as described above, the signaling messages 19 may be SIP or H.323 signaling messages and the signaling proxy 30 may be a SIP proxy or H.323 gatekeeper that processes the SIP or H.323 signaling messages 19, respectively.

In operation 62, the signaling proxy routes the signaling messages 19 toward the destination endpoint for the call. For example, the signaling proxy 30 may route the signaling messages 19 over signaling path 43 to the signaling proxy 44 in service provider network 16. This of course depends on the destination endpoint identified in the signaling messages 19. It is also possible that the media call may be directed to another endpoint connected to service provider network 14. In this case, the signaling proxy 30 may route the signaling messages 19 to another signaling proxy in service provider network 14 or directly to the destination endpoint connected to service provider network 14.

In operation 66, the signaling proxy 30 waits to receive a reply back to the forwarded signaling messages 19. For example, the signaling proxy 30 may wait to receive a reply back from signaling proxy 44 indicating the call request in signaling messages 19 is successful. If this phase of the call signaling is successful, the signaling proxy 30 then exchanges QoS control messages 33 over control path 34 with the RSVP proxy 28 in edge router 26. These QoS control messages 33, such as PCMM or DQoS messages, identify a requested QoS level for the media call, in addition to the destination address for the call.

In PCMM when the first call signaling message 19 is received, there are initial control messages 33 exchanged between the signaling proxy 30 and the policy server 32. Other control messages 33 are also exchanged between the policy server 32 and the edge router 26. These initial control messages 33 may only provide for minimal operations, such as allocation of a "gate" and some security checks. Other control messages 33 are then exchanged between the signaling proxy 30, policy server 32, and edge router 26 that establish or deny the media call after the RSVP proxy 28 receives a response back over service provider network 14 indicating a willingness to accept the call. This is described in more detail below.

Based on QoS messages 33, received back from the edge router 26, the signaling proxy 30 in operation 68 determines if the service provider network 14 will accept the media call requested by subscriber 22. The service provider network 14 may not be able to handle the call, for example, due to lack of available capacity. In this case, the signaling proxy 30 receives a failure message 33 over control path 34 from the edge router 26. Accordingly, the signaling proxy in operation 72 sends a call failure message 19 back to the subscriber 22 and the call is terminated. When a success message 33 is received from the edge router 26 in operation 68, the signaling proxy 30 in operation 70 notifies the subscriber 22 that the call establishment can proceed. Once the final phase of call establishment completes, the subscriber 22 can start sending media data over media path 24.

Figure 3:
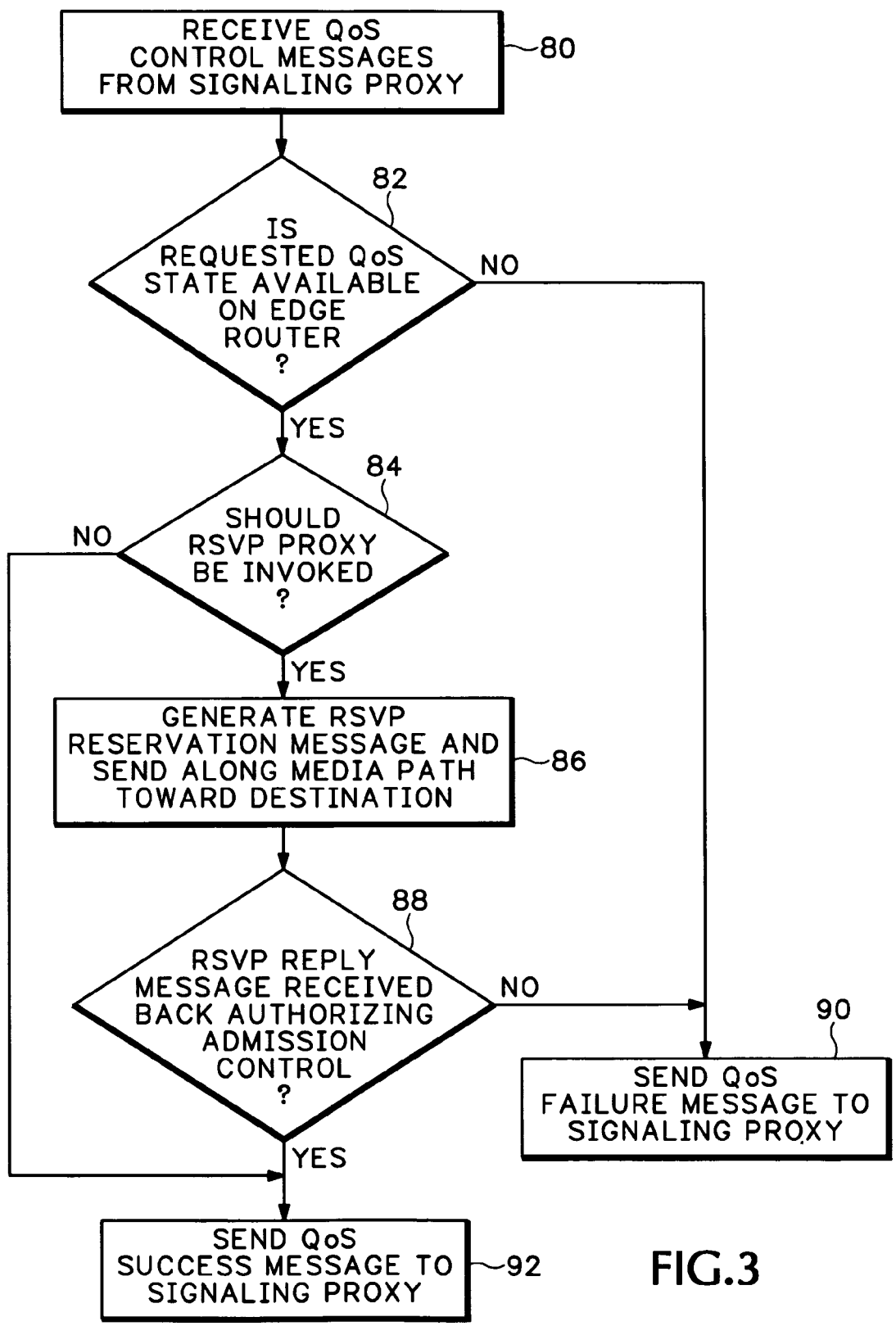
FIG. 3 is a flow diagram showing how an edge router operates in the service provider network shown in FIG. 1.

FIG. 3 shows in more detail what happens in the edge router 26 once the QoS messages 33 are received from the signaling proxy 30. In operation 80, the edge router 26 receives the QoS control messages 33, such as PCMM messages, from the signaling proxy 30 (via the policy server 32). The edge router 26 in operation 82 first determines if a requested QoS state identified in the QoS messages 33 is available over the access network. For example, the edge router 26 may determine if it can handle another VoIP call that requires a particular QoS level on the access network 20. If the requested QoS state is unavailable, the edge router 26 in operation 90 sends a QoS failure message 33 via control path 34 back to the signaling proxy 30. If the media call from subscriber 22 can be processed, the edge router 26 then performs a second stage of QoS and access control.

In operation 84, the edge router 26 determines whether the RSVP proxy 28 should be invoked. For example, the QoS messages 33 may contain particular destination and source addresses and other traffic flow attributes for the media call request. These attributes ascertained in operation 84 are correlated with predetermined relationships and/or logic to determine whether or not to send an RSVP message 37 toward the destination for the media call. For example, the edge router 26 does not bother to send RSVP messages if the other subscriber is reachable through the same edge router, because no backbone network path would be traversed in this case. Similarly, RSVP might not be initiated if the other subscriber is served by an edge router in the same point of presence (POP), because the service provider network has been engineered to have excess capacity for such cases.

Dynamic determination of whether to invoke RSVP proxy operation may also be made by using any of the techniques described in U.S. Pat. No. 6,721,272, issued Apr. 13, 2004, entitled: METHOD AND APPARATUS FOR GENERATING AN RSVP MESSAGE FOR A NON-RSVP-ENABLED NETWORK DEVICE; and in U.S. patent application Ser. No. 10/828,370, filed Apr. 19, 2004, entitled: METHOD AND APPARATUS FOR DYNAMICALLY DETERMINING WHEN TO USE QUALITY OF SERVICE RESERVATION IN INTERNET MEDIA APPLICATIONS which have already both been incorporated by reference.

If the edge router 26 does not need to invoke the RSVP proxy 28 in operation 84, a call success message 33 is sent back to the signaling proxy in operation 92. However, when the RSVP proxy 28 is invoked in operation 84, an RSVP message 37 is generated and sent toward the destination endpoint in operation 86.

Outbound Admission Control

The RSVP reservation message 37 generated in operation 86 is communicated along a potential media flow path 35 toward the intended destination endpoint. All the routing devices along the RSVP path 35 create media path state to be able to perform the admission control operation for the media call initiated by subscriber 22. In this example, the RSVP proxy 38 in the border router 36 acts as the termination point for the RSVP path 35. The RSVP proxy 38 then operates as a second stage of outbound admission control for the media call.

For example, based on a Service Level Agreement (SLA) between service provider networks 14 and 16, the RSVP proxy 38 in the border router 36 might only be able to accept a predetermined number of connections, or a limited amount of bandwidth for media over link 50. Accordingly, the RSVP proxy 38 denies any RSVP connection requests 37 that would increase the current number of connections, or exceed the bandwidth consumption on link 50 above the pre-agreed upon limit. Thus, admission control is not only provided for inbound calls at edge router 26, but also provided for outbound calls going from the border router 36 to other service provider networks. This ensures that the utilization of media traffic on the link 50 remains within the SLA for the outbound link from network 14 to network 16.

When the RSVP reservation 37 fails at the RSVP proxy 38 in the border router 36, an admission control failure message 37 is sent back to the edge router 26 which in turn controls the gate-set. For example, when there is not enough capacity on the link 50, the RSVP proxy 38 may send an RSVP failure message 37 back to the RSVP proxy 28 in operation 88. Similarly, if there is insufficient capacity on any of the links on the media path between the border router 36 and the edge router 26, this will cause a reservation failure message 37 to be reported back to the edge router 26.

The edge router 26 in operation 90 accordingly sends a call failure message 33 back to the signaling proxy 30. The QoS control messages 33 (e.g., PCMM messages) which initiated this cascade of events are known by the signaling proxy 30. Accordingly, the signaling proxy 30 can take the failure as a policy input to either proceed anyway only with QoS for access network 20, try again with a different traffic classification, or give up and divert the call to a PSTN gateway.

If sufficient capacity exists at inter-network link 50, the RSVP proxy 38 sends an RSVP RESV message back along RSVP path 35 and attempts to reserve the necessary network resources on the path 35. If there is sufficient capacity, the RSVP message arrives back at the edge router 26 in operation 88. The edge router 26 then accordingly sends a QoS success message 33 back to the signaling proxy 30 (via the policy server 32) in operation 92. The signaling proxy 30 then proceeds with the call signaling, which enables the subscriber 22 to start sending media packets over media path 24 through service provider network 14. All of the media packets transferred over media path 24 are now QoS controlled via the previously exchanged RSVP messages 37.

Dynamic Call Rerouting and Call Fallback

Another advantage of the system described above, is increased reliability. In a conventional SBC architecture, when the SBC goes down, all calls that extend over the interconnect managed by the SBC are terminated. The present system can automatically reroute a media call along an alternate path when a primary media path fails. When no media paths in the service provider network 14 are available, the media call can be automatically rerouted via a PSTN fallback path to the destination endpoint.

Figure 4:
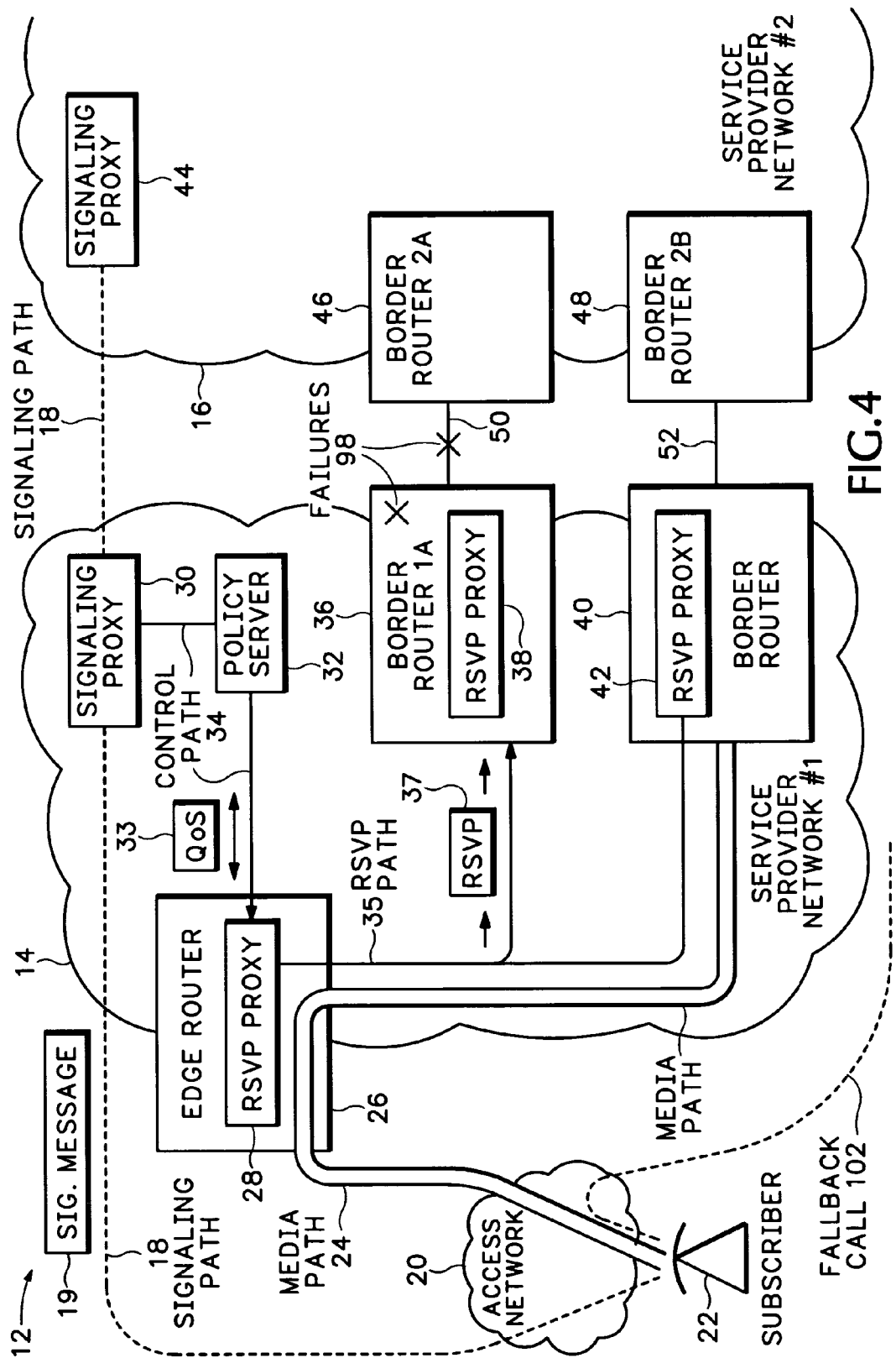
FIG. 4 is a diagram showing how a media path can be dynamically rerouted in response to a media path failure.

Referring to FIG. 4, the previous RSVP messaging 37 between RSVP proxy 28 and RSVP proxy 38 may initially be denied or fail during the media call. This can be due to any variety of reasons, including a hardware or software failure; or an over capacity problem 98 in border router 36, inter-network link 50, or some intermediary network device in media path 35. The RSVP protocol operating in network 14 can then automatically reestablish the QoS state and reestablish admission control along a new media path 100 that, in this example, terminates at boarder router 40.

The RSVP automatically moves the QoS reservation to the new path, for example, when changes in BGP routing cause the media path to move to a different interface. This functionality is not currently supported in current SBC architectures and prevents the media call on media path 24 from continuing when there is a change in the border router.

When there is no media path in network 14 that can successfully complete the media call with the required QoS, the signaling proxy 30 may then cause the subscriber 22 to establish a fallback call 102 over the PSTN access network 20 to the destination endpoint. Or if possible, the media call may be established over service provider network 14 with a lower QoS class.

Another interesting aspect of the access control scheme is that the media path 24 can be dynamically redirected in service provider network 14 without cooperation by service provider network 16. This is made possible by terminating the RSVP session at the RSVP proxy in the border router 36 or 40.

The access control scheme can also be used in combination with Multi-Topology Routing (MTR) that provides different routing topologies for different services. This is another function that is not supported in SBCs. The MTR provides separate routing for different classes of media traffic (e.g. voice, video) within the service provider network 14 and ensures routes to other service providers via the class-specific SLAs as part of the corresponding topology.

Media Calls Originating Other Service Provider Networks

Figure 5:
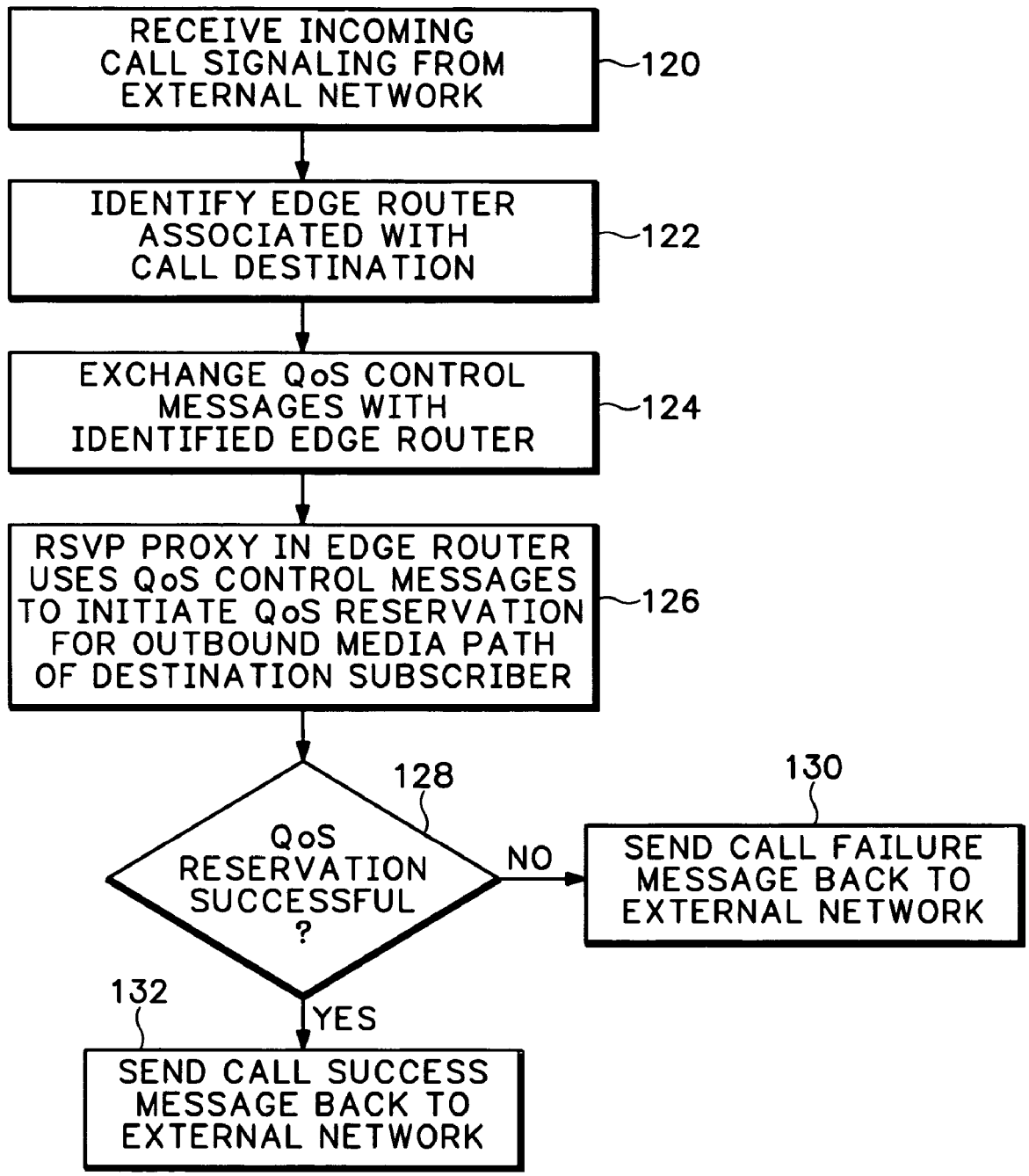
FIG. 5 is a flow diagram showing how the service provider network manages a media call from an external network.

The examples in FIGS. 1-4 describe the situation where the media call originates from a subscriber 22 connected to service provider network 14 and is then either routed to another endpoint in network 14 or to an endpoint in another service provider network 16. FIG. 5 shows one example of how the service provider network 14 handles incoming media calls originating on an external service provider network.

Referring to FIGS. 1 and 5, in operation 120 the signaling proxy 30 receives call signaling 43 from an external network. In this example, the call signaling 43 is received from service provider network 16. The call signaling 43 identifies the destination for the incoming call. In this example, the incoming call is directed to subscriber 22. In operation 122, the signaling proxy 30, operating in conjunction with the Policy Server 32, identifies the edge router 26 associated with the identified call destination. The signaling proxy 30 in operation 124 exchanges QoS control messages 33 with the identified edge router 26 using PCMM, or some other QoS control messaging scheme.

When appropriate in operation 126, the edge router 26 triggers the RSVP proxy 28 to conduct QoS reservation for an outbound media path used by subscriber 22 to communicate back with the media call received from network 16. If the QoS reservation is successful, the signaling proxy 30 receives a QoS success message 33 back from the edge router 26 in operation 128. The signaling proxy 30 in operation 132 relays a call success message over signaling path 43 back to the signaling proxy 44 for completing the media call. The QoS control messages 33 from the edge router 26 may alternatively indicate QoS reservation was unsuccessful, or that only a lower QoS is available. In operation 130, a failure, or qualified signaling success message 43 is then sent by the signaling proxy 30 to signaling proxy 44.

If the in-bound media packets are coming in through the same direction as the out-bound packets from subscriber 22 are leaving provider network 14, the border router 36 that contains the termination RSVP 38 for the outbound media packets can also perform admission control and provide a QoS reservation for the incoming packets for the same media call.

Access and Reservation Control Across Different Service Provider Networks

Figure 6:
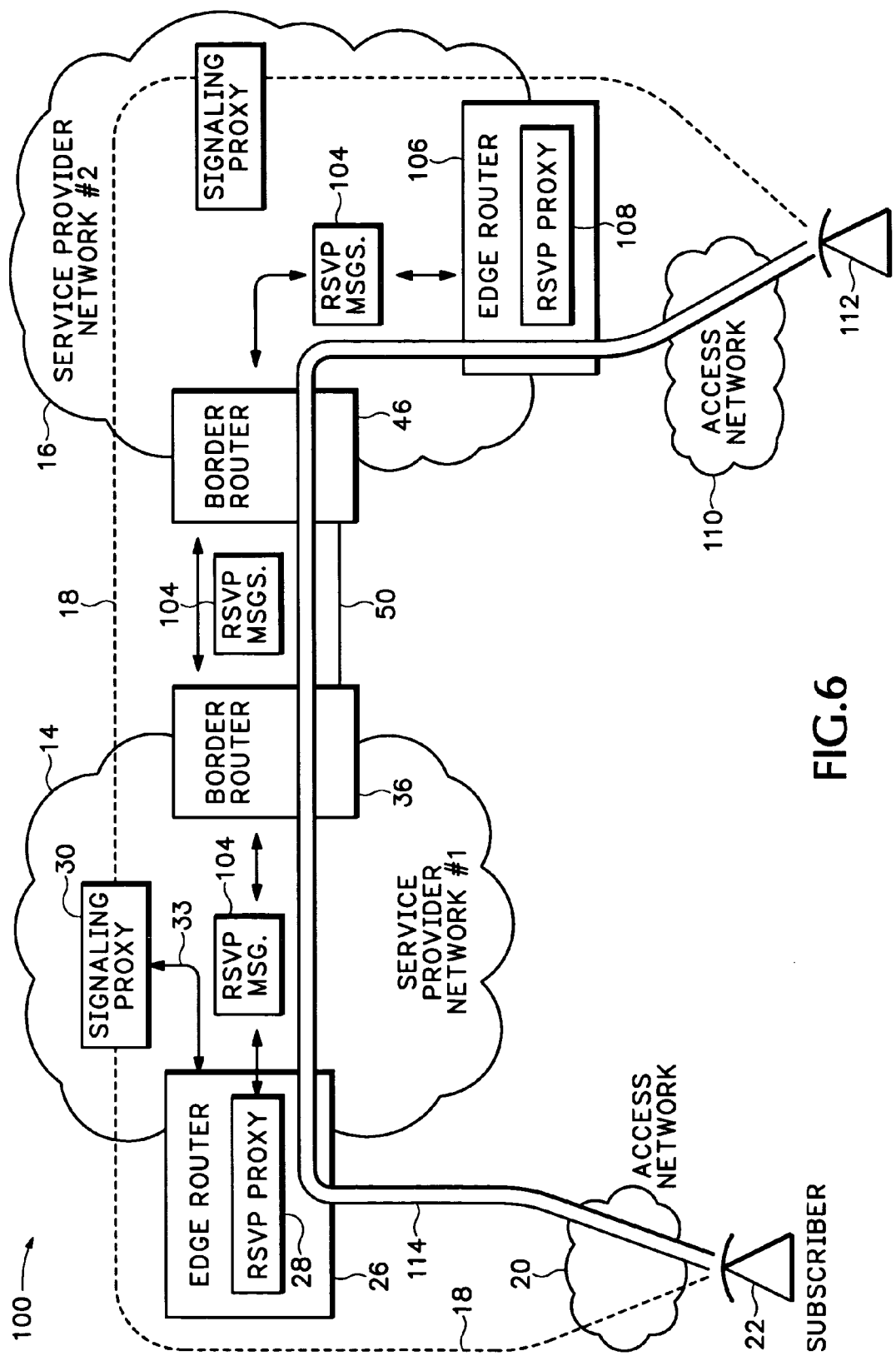
FIG. 6 is a diagram showing how QoS reservation can be performed over disparate service provider networks.

In an alternative embodiment shown in FIG. 6, coordinated QoS is provided across Autonomous System (AS) boundaries. Multiple different service provider networks may support RSVP and RSVP proxy. In this configuration, RSVP reservations, instead of being terminated in the RSVP proxy of the border router, flow across the interconnection 50 between the two service provider networks 14 and 16. This still allows the different service provider networks 14 and 16 to control QoS, since the RSVP reservation is not coming from subscribers but alternatively coming from trusted RSVP proxies operated by the service provider networks 14 and 16.

In the previous configuration shown in FIG. 1, the RSVP reservation was terminated at the RSVP proxy 38 running on the border router 36. Thus, the associated RSVP reservation messages 37 were not communicated across link 50. However, when the two service provider networks 14 and 16 are directly connected together, the existence of an SLA at the peering point may be exploited to allow RSVP to flow across link 50. For example, instead of a proxy-RESV message terminating at the border router 36, the SLA is configured to allow RSVP messages 104 into service provider network 16.

For example, the subscriber 22 may initiate a media call in the same manner described above in FIG. 1. The signaling proxy 30 exchanges the same QoS control messaging 33 with the edge router 26 using, for example, PCMM or DQoS. The edge router 26 uses information from the control messages 33 to initiate RSVP reservation messages 104 along a possible media path for the media call. However, instead of terminating at the border router 36, the RSVP messages 104 are transferred over link 50 to service provider network 16. The RSVP messages 104 continue though service provider network 16 toward the destination subscriber 112.

The RSVP messages 104 terminate at the RSVP proxy 108 in edger router 106. If the requested QoS in the RSVP message 104 is successfully allocated through the inter-network path between edge router 26 and edge router 106, the RSVP proxy 108 sends a ResV success message 104 back to the RSVP proxy 28. The edge router 26 then sends access control messaging 33 that directs the signaling proxy 30 to enable the subscriber 22 to start sending media packets over the QoS controlled media path 114. The reservation for the media flow in the opposite direction is handled identically with the roles of the RSVP proxy 108 and 28 reversed.

The RSVP messages 104 might not be forwarded over link 50 in the same way the RSVP messages are transported inside service provider network 14. Instead different mechanisms may be used to provide the necessary assurances that the RSVP messages 104 sent across the service provider network boundaries are authorized. For example, an RSVP integrity object may be sent in the RSVP messages over link 50 that contains cryptographic proof that the message was forwarded by border router 36 based on a shared secret coupled to the SLA. The RSVP integrity object is then used to authenticate and authorize the RSVP state. This has the advantage of efficiency and exploiting native RSVP security methods.

Tunneling may also be used for aggregating RSVP to create a one-hop tunnel over link 50 for transporting the SLA-specific RSVP messages 104. This has the advantage of tying the RSVP easily to the specific peering SLA. Tunneling of RSVP also can be extensible to transit scenarios where there are one or more intermediary service providers in tandem between the two cooperating providers 14 and 16.

Thus, general-purpose admission control functions in edge and border routers are combined with media path QoS control to satisfy many of the media-path QoS requirements in the service provider network. Existing routing and admission control systems, such as, existing PCMM and RSVP schemes are leveraged to provide accurate capacity-based admission control for the access network, the backbone service provider network, and the interconnect peering links to other service providers. The scheme also has the additional advantage of responding gracefully to routing changes without dropping media calls.

Multiple points of IP interconnect are supported between subscribers and a particular service provider network and between different service provider networks. For example, the RSVP proxy can operate in multiple different edge routers and border routers in the same service provider network. The same or multiple different signaling proxies can then be used in the service provider network for triggering the different RSVP proxies.

The IP interconnects can support multiple services such as voice, video and data and provides a logical separation for the interconnected services. For example, the different types of data can be routed differently and can have different QoS and different policy. Bandwidth can be assigned on a service by service basis and traffic can be steered within a service to a particular interconnect point based on available capacity. Call admission control can also be based on available interconnect capacity. For example, a peering SLA with another ISP can be controlled based on a particular amount of data traffic and admission control can prevent the establishment of a new IP session if the session would exceed the agreed upon bandwidth.

The system described above can use dedicated processor systems, micro controllers, programmable logic devices, or microprocessors that perform some or all of the operations. Some of the operations described above may be implemented in software and other operations may be implemented in hardware.

For the sake of convenience, the operations are described as various interconnected functional blocks or distinct software modules. This is not necessary, however, and there may be cases where these functional blocks or modules are equivalently aggregated into a single logic device, program or operation with unclear boundaries. In any event, the functional blocks and software modules or features of the flexible interface can be implemented by themselves, or in combination with other operations in either hardware or software.

Having described and illustrated the principles of the invention in a preferred embodiment thereof, it should be apparent that the invention may be modified in arrangement and detail without departing from such principles. I claim all modifications and variation coming within the spirit and scope of the following claims.

The invention claimed is:

1. A system for establishing media calls, comprising:
   a network processing device operating a Resource ReSerVation Protocol (RSVP) proxy that controls flow admission and Quality of Service (QoS) for a media call in a service provider network, wherein the RSVP proxy, in response to received control messaging, is configured to initiate QoS reservation with a second RSVP proxy operating at a RSVP path termination point.

2. The system according to claim 1 wherein control messaging received from a signaling proxy or policy server triggers the RSVP proxy to conduct QoS reservation over the service provider network and control outbound access from the service provider network to a different network.

3. A system for establishing media calls, comprising:
   a network processing device operating a Resource ReSerVation Protocol (RSVP) proxy that controls flow admission and Quality of Service (QoS) for a media call in a service provider network, wherein control messaging received from a signaling proxy or policy server triggers the RSVP proxy to conduct QoS reservation over the service provider network and the control messaging uses PacketCable Multi-Media (PCMM) and/or Dynamic Quality of Service (DQoS) messages.

4. A system for establishing media calls, comprising:
a network processing device operating a Resource ReSerVation Protocol (RSVP) proxy that controls flow admission and Quality of Service (QoS) for a media call in a service provider network wherein control messaging received from a signaling proxy or policy server triggers the RSVP proxy to conduct QoS reservation over the service provider network; and the network processing device initiates QoS reservation though the service provider network to an RSVP termination point and notifies the signaling proxy to complete the media call when the RSVP termination point indicates successful QoS reservation along a media path.

5. The system according to claim 4 wherein the QoS reservation is established over routes computed by Multi-Topology Routing (MTR) according to a particular media class associated with the media call.

6. The system according to claim 4 wherein the RSVP termination point is located in an edge router in another service provider network.

7. A network processing device, comprising:
a signaling proxy receiving media call signaling and using information from the media call signaling to trigger two different Resource Reservation Service Protocol (RSVP) proxies to reserve QoS along a media path in a packet switched network.

8. A network processing device, comprising:
a signaling proxy receiving media call signaling and using information from the media call signaling to trigger a Resource Reservation Service Protocol (RSVP) proxy to reserve QoS along a media path in a packet switched network, wherein the signaling proxy is a Session Initiation Protocol (SIP) or H.323 proxy that uses Packet Cable Multi-Media (PCMM) and/or Dynamic Quality of Service (DQoS) messages to trigger the RSVP proxy.

9. A network processing device, comprising:
a signaling proxy receiving media call signaling and using information from the media call signaling to trigger a Resource Reservation Service Protocol (RSVP) proxy to reserve QoS along a media path in a packet switched network, wherein the signaling proxy enables the media call when a control message is received back from the RSVP proxy indicating QoS is successfully reserved along the media path.

10. A system for managing quality of Service (QoS) for media calls in a service provider network, comprising:
a signaling proxy receiving call signaling for the media calls and generating corresponding control messages;
an edge router initiating QoS reservation along a media path in the service provider network in response to the control messages received from the signaling proxy; and
a border router located in the service provider network linked to another service provider network, the border router receiving the QoS reservation from the edge router and sending back a QoS reservation success message when the requested QoS reservation can be provided over the link with the other service provider network.

11. A system for managing Quality of Service (QoS) for media calls in a service provider network, comprising:
a signaling proxy receiving call signaling for the media calls and generating corresponding control messages; and an edge router initiating QoS reservation along a media path in the service provider network in response to the control messages received from the signaling proxy, wherein;
the edge router enables the signaling proxy to connect the media call when the QoS is successfully reserved over the media path to the border router; and
the edge router causes the signaling proxy to disconnect the media call, reroute the media call over another media path in the service provider network or in an access network, or establish the media call with a lower QoS when the QoS reservation fails over the media path to the border router.

12. A system for managing Quality of Service (QoS) for media calls in a service provider network, comprising:
a signaling proxy receiving call signaling for the media calls and generating corresponding control messages and
an edge router initiating QoS reservation along a media path in the service provider network in response to the control messages received from the signaling proxy, wherein the edge router uses Multi-Topology Routing (MTR) to provide different routing topologies for different media services.

13. A system for managing quality of Service (QoS) for media calls in a service provider network, comprising:
a signaling proxy receiving call signaling for the media calls and generating corresponding control messages;
an edge router initiating QoS reservation along a media path in the service provider network in response to the control messages received from the signaling proxy; and
a policy server coupled between the signaling proxy and the edge router for enforcing access policies for media calls received by the signaling proxy.

14. A method for controlling media connections over a network, comprising:
receiving quality of Service (QoS) control messages identifying an access network QoS;
using the access network QoS control messages to trigger Resource Reservation Service Protocol (RSVP) reservation over a service provider network; and
using the RSVP reservation to control outbound access from the service provider network to another service provider network.

15. A method for controlling media connections over a network, comprising:
receiving quality of Service (QoS) control messages identifying an access network QoS;
using the access network QoS control messages to trigger Resource Reservation Service Protocol (RSVP) reservation over a service provider network; and
using PacketCable Multi-Media or Dynamic Quality of Service (DQoS) messages to trigger the RSVP reservation over the service provider network.

16. A method for controlling media connections over a network, comprising:
receiving Quality of Service (QoS) control messages identifying an access network QoS;
using the access network QoS control messages to trigger Resource Reservation Service Protocol (RSVP) reservation over a service provider network; and
using the QoS control messages to direct a signaling proxy to enable a media call.

17. A method for controlling media connections over a network, comprising:
receiving Quality of Service (QoS) control messages identifying an access network QoS;

using the access network QoS control messages to trigger Resource Reservation Service Protocol (RSVP) reservation over a service provider network; and sending the RSVP reservation though the service provider network to an RSVP proxy termination point in another service provider network and enabling a media call when the QoS identified in the QoS control messages is successfully reserved through a media path to the RSVP proxy termination point.

18. A method for controlling media connections over a network, comprising:

receiving Quality of Service (QoS) control messages identifying an access network QoS;

using the access network QoS control messages to trigger Resource Reservation Service Protocol (RSVP) reservation over a service provider network; and establishing routes computed by Multi-Topology Routing (MTR) according to a particular media class associated with the media call and conducting the RSVP reservation along the established routes.

19. A system for controlling media connections over a network, comprising:

means for receiving Quality of Service (QoS) control messages identifying an access network QoS;

means for using the access network QoS control messages to trigger Resource Reservation Service Protocol (RSVP) reservation over a service provider network; and means for using the RSVP reservation to control outbound access from the service provider network to another service provider network.

20. A system for controlling media connections over a network, comprising:

means for receiving quality of Service (QoS) control messages identifying an access network QoS;

means for using the access network QoS control messages to trigger Resource Reservation Service Protocol (RSVP) reservation over a service provider network; and means for using PacketCable Multi-Media or Dynamic Quality of Service (DQoS) messages to trigger the RSVP reservation over the service provider network.

21. A system for controlling media connections over a network, comprising:

means for receiving quality of Service (QoS) control messages identifying an access network QoS;

means for using the access network QoS control messages to trigger Resource Reservation Service Protocol (RSVP) reservation over a service provider network; and means for using the QoS control messages to direct a signaling proxy to enable a media call.

22. A computer storage medium containing instructions for controlling media connections over a network, the instructions when executed comprising:

receiving Quality of Service (QoS) control messages identifying an access network QoS;

using the access network QoS control messages to trigger Resource Reservation Service Protocol (RSVP) reservation over a service provider network, wherein the RSVP reservation is used to control outbound access from the service provider network to another service provider network.

\* \* \* \* \*

UNITED STATES PATENT AND TRADEMARK OFFICE
CERTIFICATE OF CORRECTION

PATENT NO.         : 7,502,320 B2                                          Page 1 of 1
APPLICATION NO. : 11/176785
DATED                 : March 10, 2009
INVENTOR(S)       : David R. Oran It is certified that error appears in the above-identified patent and that said Letters Patent is hereby corrected as shown below:

Column 11, Line 7, delete "network" and insert -- network, --, therefor.

Column 11, Line 11, delete "though" and insert -- through --, therefor.

Column 11, Line 48, delete "quality" and insert -- Quality --, therefor.

Column 12, Line 4, delete "wherein;" and insert -- wherein: --, therefor.

Column 12, Line 17, delete "messages" and insert -- messages; --, therefor.

Column 12, Line 25, delete "quality" and insert -- Quality --, therefor.

Column 12, Line 37, delete "quality" and insert -- Quality --, therefor.

Column 12, Line 47, delete "quality" and insert -- Quality --, therefor.

Column 13, Line 4, delete "though" and insert -- through --, therefor.

Column 14, Line 1, delete "quality" and insert -- Quality --, therefor.

Column 14, Line 12 (approx.), delete "quality" and insert -- Quality --, therefor.

Signed and Sealed this

Twenty-second Day of December, 2009

David J. Kappos
*Director of the United States Patent and Trademark Office*